United States Patent [19]
Blonstein

[11] Patent Number: 5,153,747
[45] Date of Patent: Oct. 6, 1992

[54] COLOR SCANNER WITH BUILT-IN COLOR COMPRESSION HARDWARE TO REDUCE SCAN TIME

[75] Inventor: Steve M. Blonstein, San Jose, Calif.

[73] Assignees: Ricoh Company, Ltd., Tokyo, Japan; Ricoh Corporation, Menlo Park, Calif.

[21] Appl. No.: 486,123

[22] Filed: Feb. 28, 1990

[51] Int. Cl.$^5$ ............................................. H04N 1/32
[52] U.S. Cl. ..................................... 358/426; 358/75
[58] Field of Search ............... 358/78, 75, 80, 261.1, 358/261.2, 426, 429

[56] References Cited

U.S. PATENT DOCUMENTS

| | | | |
|---|---|---|---|
| 4,581,656 | 4/1986 | Wada | 358/426 |
| 4,768,082 | 8/1988 | Hiratsuka et al. | 358/426 |
| 4,783,841 | 11/1988 | Crayson | 358/426 |
| 4,814,898 | 3/1989 | Arimoto et al. | 358/426 |
| 4,853,778 | 8/1989 | Tanaka | 358/426 |

*Primary Examiner*—Stephen Brinich
*Attorney, Agent, or Firm*—Heller, Ehrman, White & McAuliffe

[57] ABSTRACT

The color image scanner includes built-in color compression capabilities to reduce scan time. The improved color scanner scans a color image on a document to provide color image data having a bandwidth of approximately 4-5 megabytes per second. The color image scanner stores the digital color image data on a line by line basis and shifts the stored data into a transmit line circuit. The scanner further includes compression means for compressing the image data at a ratio of approximately 10:1 which is suitable for input to a personal computer for further processing.

8 Claims, 5 Drawing Sheets

$$\begin{matrix} 0 & -1 & -1 & -1 & 0 \\ -1 & 1 & 4 & 1 & -1 \\ -1 & 4 & 10 & 4 & -1 \\ -1 & 1 & 4 & 1 & -1 \\ 0 & -1 & -1 & -1 & 0 \end{matrix}$$

$$\begin{matrix} Y \\ I \\ Q \end{matrix} = \begin{matrix} a_{11} & a_{12} & a_{13} \\ a_{21} & a_{22} & a_{23} \\ a_{31} & a_{32} & a_{33} \end{matrix} \begin{matrix} R \\ G \\ B \end{matrix}$$

·       ·   ·              I_{11}     I_{12}
    Q                            I_{avg}
·   ·   ·   ·              I_{21}     I_{22}

```
* * * * A B * * * * * *                      EXAMPLE
* * * * C ? / − − − − −    A  B          125   130
− − − − / / / − − − − −    C  ?  /       102    ?    /
− − · − − − − − − − − −    / / /          /    /    /
```

| DELTA QUANTIZE TABLE | | Y DATA | |
|---|---|---|---|
| Z | | −1 | |
| N1 | P1 | −7 | +5 |
| N2 | P2 | −15 | +15 |
| N3 | P3 | −29 | +35 |
| N4 | P4 | −57 | +61 |
| N5 | P5 | −91 | +91 |
| | PN6 | | +127 |
FIG.−9      FIG.−10B
| Y DATA | | I & Q DATA | |
|---|---|---|---|
| +1 | | | |
| −5 | +7 | −3 | +5 |
| −13 | +17 | −11 | +13 |
| −27 | +37 | −23 | +25 |
| −55 | +63 | −45 | +47 |
| −89 | +93 | −81 | +83 |
| | +127 | | +129 |
FIG.−10A−1      FIG.−10A−2
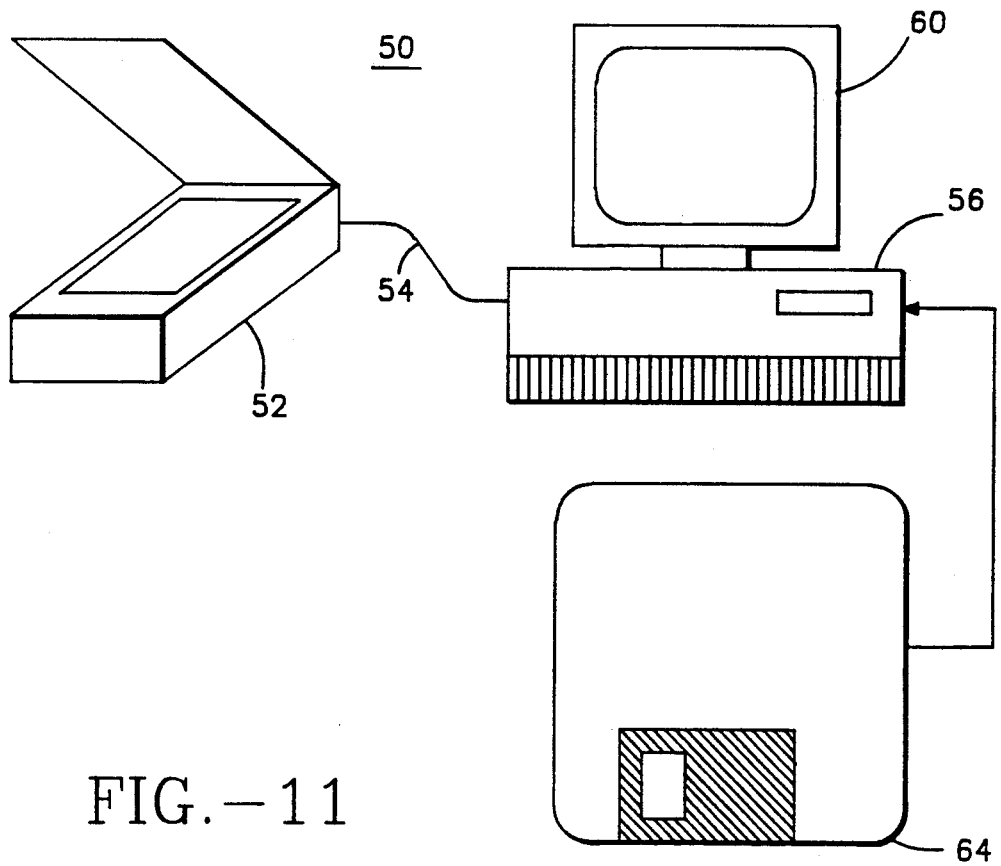
FIG.−11

COLOR SCANNER WITH BUILT-IN COLOR COMPRESSION HARDWARE TO REDUCE SCAN TIME

CROSS-REFERENCE TO RELATED APPLICATIONS

The present application is related to co-pending patent application entitled "High Quality Color Image Compression System," Ser. No. 445,387, filed Dec. 4, 1989, which is assigned to the same assignee as the present invention.

BACKGROUND OF THE INVENTION

The present invention relates to a color image compression method and apparatus.

Color image scanners with built-in compression schemes have been well known in the prior art (as long as there have been facsimile machines). However, the purpose for that compression is to reduce the bandwidth required in a transmission medium. That transmission medium is invariably a telephone line and at the other end is another facsimile machine.

Color facsimile systems are known (such as one manufactured by Star Signal of Campbell, California). That system has a color scanner, a PC computer with compression board(s) plugged in, and a color printer for output. Full color images are transmitted from the scanner to the PC where the image is passed to a color compression board and then transmitted down a telephone line. Incoming messages are received by the PC, decompressed by the board(s) and sent to the printer.

The limiting factor in modern day scanners is the bandwidth of the link, as indicated above. Typically scanners are able to produce data up to 4–5 Megabytes per second, while the transmission link (that from the transmit line to the PC) is only capable of 0.5 Megabytes per second.

It would be desirable, therefore, to provide an improved color image compression apparatus and method.

SUMMARY OF THE INVENTION

It is an object of the present invention to provide a color image compression apparatus and method. It is a more particular object to provide an improved color image compression apparatus and corresponding method where the compression is formed within the color image scanner itself.

Briefly, the present invention includes means for scanning information on a document and to provide color image data signals representative of that image. The color image data typically has a bandwidth of 4–5 Megabytes per second. The color image data is stored on a line-by-line basis and shifted into a transmit line circuit. The present invention includes compression means for compressing the image data at a ratio of approximately 10:1. This compressed color image data is then suitable for input to a personal computer (PC) for further processing.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

FIGS. 6A, 6B, 6C and 6D depict spatial reduction of the YIQ color planes.

FIG. 7 depicts a series of pixels after spatial reduction.

FIG. 8A-8B depict an illustration of a particular set of pixel values about to be delta quantized.

FIG. 9 depicts a delta quantized table.

FIGS. 10A-1, 10A-2 and 10B depict typical values of a delta quantized table used for Y, I and Q data.

FIG. 11 shows an apparatus for a color compression system utilizing aspects of the present invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
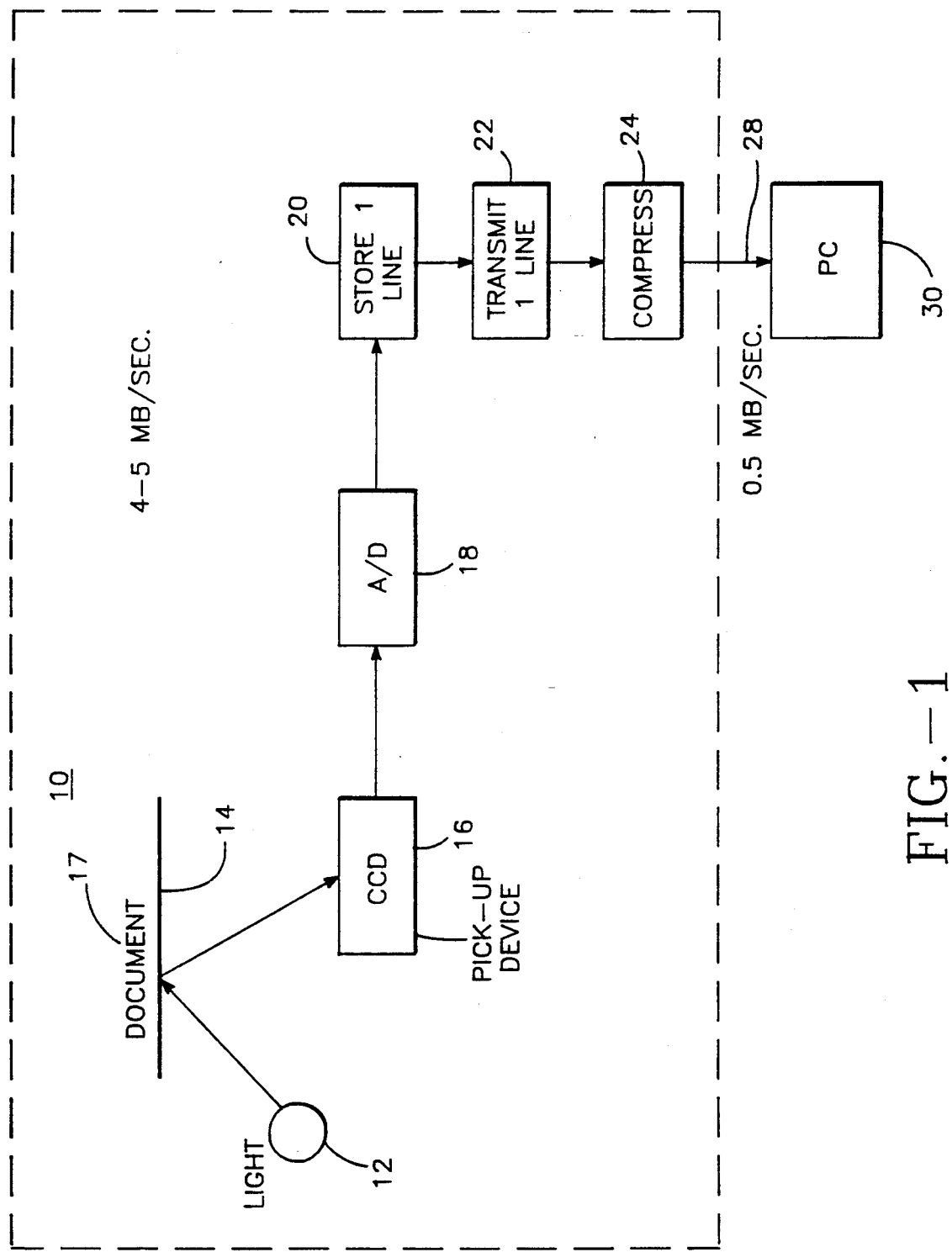
FIG. 1 depicts a block diagram of a color image compression scanner according to the present invention.

Referring now to FIG. 1, an improved color image scanner 10 according to the present invention is depicted.

In FIG. 1, a light source 12 reflects light through a piece of glass 14 to a document 17 which contains image information thereon. Reflective light falls on a charge coupled device (CCD) 16 which puts out an analog signal to A/D (analog to digital) converter circuit 18.

The analog data is digitized and passed to a line store circuit 20, which then shifts the digitized data one line at a time into a transmit line circuit 22. The data from transmit line circuit 22 is then compressed at approximately a 10:1 compression ratio to compression circuit 24.

In FIG. 1, the scanner produces data at between 4–5 Megabytes a second. The desired link for attachment to PC circuit 30 is typically 0.5 Megabytes per second. It can be seen that compression circuit 24 provides the needed 10:1 compression ratio desired. The compressed data can be transmitted via data link 28 to a personal computer (PC) 30 for processing.

Experimental work has shown that a normal color image requires 24 bits per pixel in order to represent a full color image. Full color refers to the ability to show up to 16 million colors simultaneously. Using smart color compression techniques, it is possible to build an "indistinguishable" full color image at around 3 to 4 bits per pixel.

Normal color scanners produce 24 bits per pixel at up to 400 dpi. A good example of such a scanner is Ricoh's FS-1 color scanner. It has an extremely high speed video interface that transmits data at around 3 MB/sec at 400 dpi. Thus, a full 8½×11 page requires about 45 MB of data and takes roughly 15 seconds to transmit. This is very fast by industry standards because of the video interface. The drawback, however, is the requirement for an expensive adapter card to sit in the host PC. It means a large expensive frame buffer on that card and makes the cost of the system prohibitive.

One aspect of the present invention is to provide an industry standard SCSI interface to hook to machines such as the Apple Macintosh color machines. It will still be a 24 bit per pixel scanner but data is passed to the PC via the SCSI port.

SCSI is specified at about 1 MB/sec, but that tends to be the theoretical limit, and 300-500K/sec is a more realistic figure. In the case of a "Macintosh" type computer, a large image would have to be spooled to disk, meaning that a block would be read from the scanner and then subsequently written to the drive. This halves the performance, again putting one at the 150-250K/sec mark. For a 45 MB image, one is looking at anywhere from 100 to 300 seconds for scan time. This is because of SCSI and not because the scanner cannot go any faster.

The present invention compresses the color image in the scanner of FIG. 1 and not the PC. By sending various commands to the scanner, it would be possible to compress the image to, say, 3 bits per pixel before SCSI transmission. One can see that the scan time drops almost one order of magnitude.

To do color compression, one needs all three colors simultaneously. One preferred embodiment does just that by making a single pass. One compression technique to be described provides around 3 bits per pixel and requires only two lines of data to be present before compression can start.

An additional advantage is that the 45 MB image now has become 6 MB. It arrives at the PC in that form, which saves disk space as well. There is no need to compress the image inside the PC. Decompression could be performed in software or hardware, depending upon cost/speed requirements.

A suitable compression technique which could be utilized with the present invention is described in the cross-referenced application entitled "High Quality Color Image Compression System." However, details of that compression technique will now be described in conjunction with the accompanying drawings.

Figure 2:
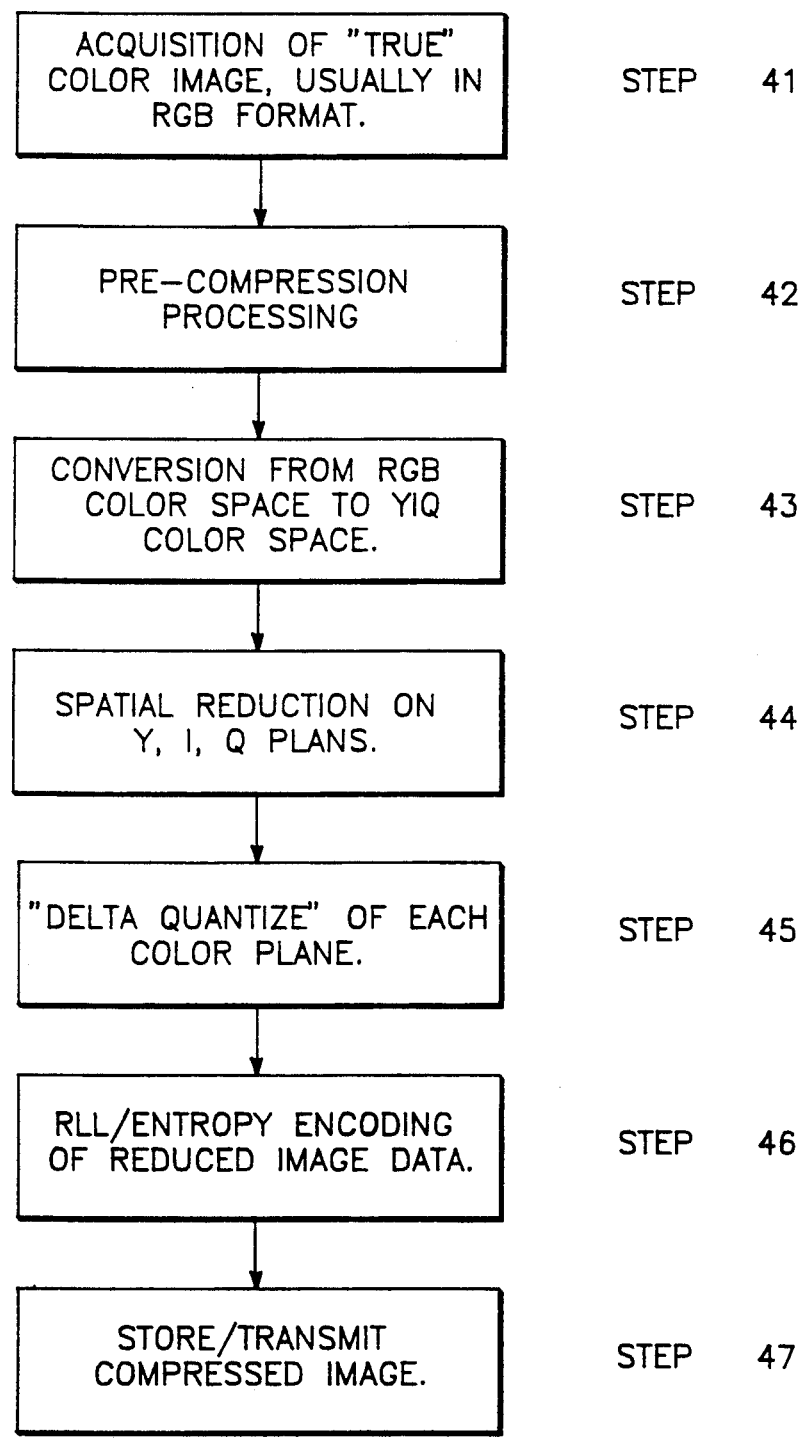
FIG. 2 depicts a color image compression flow chart which could be utilized with the present invention.

Referring now to FIG. 2, a color image compression flow chart according to the present invention is depicted. The color image compression flow chart of FIG. 1 illustrates the sequence of steps from acquiring the color image to providing the storing and transmission of the compressed color image.

In FIG. 2, the first step 41 includes the acquisition of a "true" color image, usually in a RGB (red, green, blue) format. The acquisition of color image data in an RGB format is a well known technique.

The next step 42 includes the step of precompression processing.

The next step 43 provides the conversion from RGB color space to YIQ color space, which is also a known technique.

The next step 44 provides spatial reduction on the YIQ color space (on the YIQ planes).

Step 45 provides for a delta quantizing of each of the YIQ color planes, as will be described in further detail below.

Step 46 provides the step of run length limited (RLL) and entropy encoding of the reduced image data.

Finally, step 47 includes the step of storing and transmitting the high quality color compression image data according to the present invention.

Further details and aspects of the color image compression flow chart of FIG. 2 will be described in more detail in connection with the remaining Figures.

Referring now to FIGS. 3-10, the more detailed aspects of the decompression algorithm of FIG. 2 will now be described in more detail.

Figures 3, 4, 5:
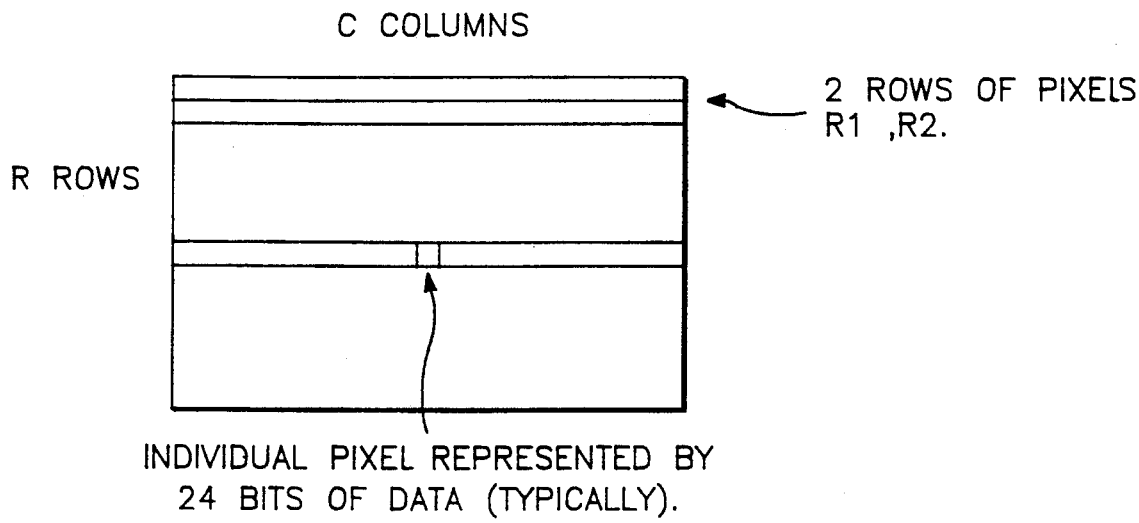
FIG. 3 depicts a sample image illustrating the acquisition of true color image of FIG. 2.
FIG. 4 depicts a kernel representation utilized with FIG. 2.
FIG. 5 depicts a conversion from RGB to YIQ color space.

FIG. 3 shows a sample color image with parameters to describe a sample image representation. FIG. 3 depicts the acquisition of true color image, usually in RGB format, which is Step 11 in FIG. 2. In FIG. 3, the total number of pixels in a color image is given by R rows and C columns. Each pixel is typically represented by 24 bits of data ("true" color). The 24 bits of data is typically broken down to eight bits each for red, green and blue (RGB). The color image can be from a plurality of input sources such as a color scanner, mass storage device, video capture device, and the like. Some prior art approaches require the whole image to be buffered before color processing may start. Other types require eight lines or sixteen lines to be buffered. The present invention provides for color image compression on a minimum of just two lines of pixel data, e.g., R1, R2 from FIG. 3. This minimizes the buffer requirements in contrast with other prior art approaches.

The pre-compression processing Step 42 of FIG. 2 will now be described in more detail. Before any compression takes place, it is often desirable to pass a convolution across the color image. The present high quality color compression technique according the present invention is improved if the image is pre-filtered by a convolution that performs both edge enhancement and a certain degree of smoothing. An example of such a kernel is illustrated in FIG. 4. It should be noted that 3×3 or 5×5 convolutions can be applied. The number illustrated in FIG. 4 serves only as an example. Kernels are normally, but not necessarily, symmetric.

The Step 43 conversion from RGB color space to YIQ color space will now be described in more detail.

The standard RGB format desirably is converted to YIQ color space. Standard linear transformations are used, one of which is depicted in FIG. 5. The transformation may be accomplished through the use of lookup tables as opposed to matrix multiplication. The transformation to YIQ color space provides the ability to perform spatial resolution reduction on each plane (each YIQ plane) individually. Typically, the Q plane can be spatially reduced more than the I plane, which can be reduced more than the Y plane.

The Step 44 of spatial reduction on the YIQ planes of FIG. 2 will now be described in more detail.

Spatial reduction is applied to each of the three planes (YIQ planes), depending upon the compression ratio required or desired. For very high quality results, but relatively low compression ratio (about eight bits per pixel), no spatial reduction need be used. For around three to four bits per pixel, the scheme depicted in FIGS. 6A, 6B and 6C might be utilized.

In FIG. 6A, no spatial reduction is used on the Y plane. In FIG. 6B, a 2:1 spatial reduction is utilized on the I plane. In FIG. 6C, a 4:1 reduction is utilized on the Q plane.

The method used to get the average value may be varied. For example, the average of the I plane pixel may be depicted, as in FIG. 6D, and it is desired to determine what is $I_{avg}$. It is possible to use the following calculations:

1) $I_{avg} = I_{11}$
2) $I_{avg} = (I_{11} + I_{12} + I_{21} + I_{22})/4$
3) Some other weighted average of surrounding pixels The delta quantizing Step 45 of each color plane (YIQ planes) will now be described in more detail. Consider the example depicted in FIG. 7, which shows a series of pixels, after spatial reduction. The illustration represents one of the three color planes (YIQ). Assume that the data in FIG. 7 is from the Y plane, where the ABC pixels are previously processed pixels, the "?" is the current pixel under examination, and where the "—", "/" are yet unprocessed pixels, and where the "/" indicates that error diffusion will be applied.

In FIG. 7, the "A" pixel is proximate to the "?" pixel, being within the scan line above and left of the "?" pixel. Similarly, the "B" pixel is directly or immediately above the "?" pixel, and the "C" pixel is proximate (directly left) of the "?" pixel.

In order to understand the aspects of the present invention, consider one particular set of values to be delta quantized as depicted in FIGS. 8A and 8B. Focus in on one of the eight pixels of most interest in FIG. 7A and 7B and assign hypothetical values as illustrated in FIG. 8B.

In FIG. 8B, the numbers 125, 130 and 102 have already been quantized. Assume that the prequantization value for "?" is 147. The first task is to decide from which pixel to "delta quantize." The present invention utilizes a method which calculates the absolute difference of (B−A) and (C−A). Whichever absolute difference is greater, the "?" pixel is quantized from that one pixel. In the example of FIG. 8B, 102 is clearly further from 125 than 130. Thus, the "?" pixel is quantized from 102.

FIG. 9 depicts a representation of a delta quantized table. The delta quantized table is an asymmetric nonlinear quantized table, different for each of the YIQ planes. A quantized table can be made up of various delta quantized values, say 12, in one preferred embodiment. These delta quantized values are represented in FIG. 9.

In FIG. 9, the N stands for negative, the P stands for positive. Note that any number of values could be used, although the 12 value is the one preferred embodiment.

In FIG. 9, the table is asymmetric, i.e., ABS(N3-N2) is not necessarily equal to ABS(P3-P2). The reason for this is that the human eye perceives small decreases in intensity more easily than small increases.

The table in FIG. 9 is also non-linear, i.e., $(N_x-N_{x-1})$ greater than symbol $(N_{x-1}-N_{x-2})$. Again, this attributed to the human eye characteristic that large intensity changes are easily perceived, but that the magnitude is hard to judge. Thus, more values can be assigned to the more critical "small" steps.

FIGS. 10A-1 and 10A-2 and 10B depict typical tables used for Y, I and Q data.

Another feature of the present invention is to use delta quantize tables that change between odd and even pixel numbers. For example, for the first pixel in a line, use the table in FIG. 10A. Then, when doing the second pixel in the line, move the values slightly, as shown in FIG. 10B.

A similar thing can be done to the I and Q data. This improves the compression considerably. The main reason is that the value of the Z token now stretches form +1 to −1 from pixel to pixel. This provides a so-called "wide zero" effect, resulting in longer runs of Z tokens and subsequently greater compression ratios.

For pixels 1, 3, 5, 7, etc., use the table in FIG. 10A-1 and 10A-2 as the delta quantize table. For pixels 2, 4, 6, 8, etc., use the table in FIG. 10B. Given the example delta quantized table, it is now possible to complete the example of FIG. 8B.

Using the fact that 102 is a greater distance from 125 than 130, the "?" pixel's prequantized value is 147 as a delta of +45. Looking at FIG. 10A-1, +45 is closest to the P3 value which is assigned +37. Thus, the delta quantized value of "?" becomes 102 +37, i.e., 139.

An error on the "?" pixel of negative eight was introduced. It is possible to limit the effect of the quantization error by error diffusing the difference to neighboring unquantized pixels. The four "/" pixels are, for example, increased by two (if the error is to be fully distributed).

Some special cases should be addressed at this time.
1) Border conditions are set so that the pixels have values 128, so that there is always something to quantize from.
2) If a "?" pixel data is exactly halfway between two table values, one of two possibilities may occur. The first is to randomly round the value up or down, but never in the same direction at all times. This could lead to chromatic distortions. Secondly, the delta quantized table should be set so that the above scenario cannot occur. This is achieved by making all $(P_x-P_{x-1})$ and $(N_x-N_{x-1})$ even.

The RLL/entropy encoding Step 46 of FIG. 2 will now be described in more detail below.

The tables shown in FIGS. 10A-1 and 10A-2 and 10B tend to lead to occurrences of the zero value. Many of these occur in runs. Significant gains in coding result because of this phenomenon.

P1 and N1 are considered the highest probability to occur. They receive the most privileged tokens A1 and B1. The decision has to be made which of these two received the 00 code and which the 01 code. A good method seems to be to choose the one that is closest to zero.

A sample RLL/entropy table is shown below in Table I:

TABLE I

| | |
|---|---|
| 00 = | B1 (if after Z) |
| 000 = | Isolated Z |
| 001 = | B1 (if not after Z) |
| 01 = | A1 |
| 10f = | N2/P2 |
| 110f = | N3/P3 |
| 1110f = | N4/P4 |
| 11101f = | N5/P5 |
| 11101100 = | PN6 |
| 1110111{1}0w = | N*16 + 9 + W consecutive Zeros |
| 1111{1}0 = | N+2 consecutive Zeros | where:
f = a single bit (0=N;1=P)
w = 4 bits, evaluated as number W=0–15
{1} = N consecutive 1's The store and transmit compression image Step 47 of FIG. 2 will now be described in more detail:

The raw compressed file is taken and the RLL/entropy table is used to generate the values Z, N1, P1, etc., for the entire image.

Color planes are rebuilt using the reverse process that the delta quantizer used. For example:

| Y data | | | |
|---|---|---|---|
| 130 | 137 | 132 | 169 |
| 131 | P1 | N1 | P2 |

Consider the P1 value above. Because 137 is "further" from 130 than 131, it must have been delta quantized from 137. Thus, replace the P1 with 137 +7 (taken from P1 in FIG. 10A-1)=144.

| 130 | 137 | 132 | 169 |
|---|---|---|---|
| 131 | 144 | N1 | P2 |

Now the N1 uses the 144 due to the fact that 144 is further from 137 than 132. Thus, replace N1 by 144−7=137 (taken from N1 in FIG. 10B), and so on.

FIG. 11 shows an apparatus 50 for a color compression system utilizing aspects of the present invention. In FIG. 11, the system 50 includes a color image scanner 52 that typically produces 24 bits per pixel at 300 dots per inch. A typical image size is approximately 30 Mbytes of data for an 8.5×11 original document. The scanner 52 is connected via cable 54 to a PC interface. The cable 54 is typically SCSI, GPIB or the like.

The PC 56 includes a color monitor 60 to view scanned images. PC 56 either runs algorithm in software or, in the alterantive, hardware performs compression on a scanned image. The hardware could be designed and implemented by one of ordinary skill in the art when utilizing aspects of the present invention.

The output of the compression algorithm could be a compressed image file small enough to fit on a single 1.4 Mbyte floppy disk 64, as depicted in FIG. 11. For example, by using 2:1 spatial compression on the Y plane, 4:1 on the I and Q planes, and then delta quantizing, the typical reduction is about 25:1. Thus, the original 30 Mbyte file becomes about 1.2 megabytes.

The foregoing description of a preferred embodiment of the invention has been presented for purposes of illustration and description. It is not intended to be exhaustive or to limit the invention to the precise form disclosed, and obviously many modifications and variations are possible in light of the above teaching. The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A color scanner for scanning a color image on a document and transmitting color image data extracted from said color image in a standard transmission format to a control means, said color scanner comprising
 means for scanning information on a document on a line by line basis to provide pre-compression color image digital data representative of said image having a certain bandwidth,
 means for storing a small number of lines of said pre-compression digital color image data,
 transmit line means,
 means for shifting said stored lines of pre-compression image data into said transmit line means,
 compression means,
 said transmit line means including means for transmitting said stored lines of pre-compression image data to said compression means,
 said compression means including means for compressing said stored lines of pre-compression image data with a predetermined compression ratio to provide post-compression image data, the bandwidth of said post-compression image data being equal to the bandwidth of said pre-compression image data divided by said compression ratio, said post-compression image data having a bandwidth less than the maximum bandwidth of said standard transmission format, and
 means for transmitting said post compression color image data to said control means in said standard transmission format, thereby reducing the amount of data storage required in said scanner.

2. A scanner as in claim 1 wherein said compression means provides real time data compression of said pre-compression image data.

3. A scanner as in claim 2 wherein wherein said standard transmission format is SCSI.

4. A scanner as in claim 3 wherein said certain bandwidth is approximately 5 megabytes per second.

5. A scanner as in claim 4 wherein said compression ratio is approximately 10:1.

6. A scanner as in claim 1 wherein said small number is two.

7. A scanner as in claim 1 wherein said small number is one.

8. In a color scanner for scanning a color image on a document and transmitting color image data extracted from said color image in a standard transmission format to a control means, wherein the scanner includes a transmit line means, the method comprising the steps of
 scanning information on a document on a line by line basis to provide pre-compression color image digital data representative of said image having a certain bandwidth,
 storing a small number of lines of said pre-compression digital color image data,
 shifting said stored lines of pre-compression image data into said transmit line means,
 compressing said pre-compression image data received from said transmit line means with a predetermined compression ratio to provide post-compression image data after receiving said lines of said pre-compression image data, the bandwidth of said post-compression image data being equal to the bandwidth of said pre-compression image data divided by said compression ratio, said post-compression image data having a bandwidth less than the maximum bandwidth of said standard transmission format,
 means for transmitting said post-compression color image data in said standard transmission format to said control means, thereby reducing the amount of data storage required in said scanner.

* * * * *